(12) United States Patent
Huijzers et al.

(10) Patent No.: US 10,272,768 B2
(45) Date of Patent: Apr. 30, 2019

(54) ADJUSTMENT SYSTEM, PRIMARY ADJUSTMENT UNIT AND SECONDARY ADJUSTMENT UNIT, AIR INTAKE, MOTOR VEHICLE

(71) Applicant: MCi (Mirror Controls International) Netherlands B.V., Woerden (NL)

(72) Inventors: Bastiaan Huijzers, Woerden (NL); Steve van Hoof, Woerden (NL)

(73) Assignee: MCI (MIRROR CONTROLS INTERNATIONAL NETHERLANDS B.V., Woerden (NL)

( * ) Notice: Subject to any disclaimer, the term of this patent is extended or adjusted under 35 U.S.C. 154(b) by 754 days.

(21) Appl. No.: 14/405,877

(22) PCT Filed: Jul. 2, 2013

(86) PCT No.: PCT/NL2013/050482
§ 371 (c)(1),
(2) Date: Dec. 5, 2014

(87) PCT Pub. No.: WO2014/007617
PCT Pub. Date: Jan. 9, 2014

(65) Prior Publication Data
US 2015/0217633 A1 Aug. 6, 2015

(30) Foreign Application Priority Data
Jul. 2, 2012 (NL) ..................... 2009105

(51) Int. Cl.
*B60K 11/06* (2006.01)
*B60K 11/08* (2006.01)

(52) U.S. Cl.
CPC ............ *B60K 11/085* (2013.01); *B60K 11/06* (2013.01); *Y02T 10/88* (2013.01)

(58) Field of Classification Search
CPC ........ B60K 11/085; B60K 11/04; B60K 11/06
See application file for complete search history.

(56) References Cited

U.S. PATENT DOCUMENTS

| 1,393,161 A | 10/1921 | Raleigh |
| 2,752,111 A | 6/1956 | Schairer |

(Continued)

FOREIGN PATENT DOCUMENTS

| DE | 3506156 | 2/1986 |
| DE | 3438709 | 4/1986 |

(Continued)

OTHER PUBLICATIONS

International Search Report from PCT/NL2011/050766 (WO 2012/067502), dated Dec. 15, 2011.

(Continued)

*Primary Examiner* — Hau V Phan
(74) *Attorney, Agent, or Firm* — Adsero IP (57) ABSTRACT

The invention relates to a system for adjusting at least two sets of shutoff elements of an air intake of a motor compartment of a motor vehicle. The system comprises at least two adjustment units. Each adjustment unit comprises a drive unit comprising an electric motor and a drive train for adjusting a set of shutoff elements. One adjustment unit is a primary adjustment unit and a further adjustment unit is a secondary adjustment unit. The primary adjustment unit is arranged for primary connection with a central control unit, such as an onboard computer of a motor vehicle. Also, the primary adjustment unit is arranged for secondary connection with the secondary adjustment unit. In the system the secondary adjustment unit has no direct connection with the central control unit.

11 Claims, 4 Drawing Sheets

(56) References Cited

U.S. PATENT DOCUMENTS

| | | | |
|---|---|---|---|
| 4,926,921 A | 5/1990 | Heinemann | |
| 5,732,666 A | 3/1998 | Lee | |
| 6,142,108 A | 11/2000 | Blichmann | |
| 6,145,241 A | 11/2000 | Ricci | |
| 6,565,221 B2 | 5/2003 | Guttenberger | |
| 7,498,926 B2 | 3/2009 | Browne | |
| 7,866,737 B2* | 1/2011 | Browne | F24F 13/1426 296/193.1 |
| 8,161,919 B2 | 4/2012 | Klotz | |
| 8,336,509 B2* | 12/2012 | Kim | F01P 7/12 123/41.04 |
| 8,544,581 B2* | 10/2013 | Stokes | B60R 19/48 180/68.1 |
| 8,561,738 B2* | 10/2013 | Charnesky | B60K 11/085 180/68.1 |
| 8,689,917 B2 | 4/2014 | Miesterfeld | |
| 8,794,360 B2* | 8/2014 | Nemoto | B60K 11/085 180/68.1 |
| 8,825,308 B2* | 9/2014 | Nishimura | B60H 1/3208 180/68.1 |
| 8,936,121 B2* | 1/2015 | Vacca | B60K 11/04 165/44 |
| 8,973,607 B2* | 3/2015 | Schwarz | B60K 11/085 137/601.08 |
| 8,983,736 B2* | 3/2015 | Hirota | B60K 11/085 123/41.04 |
| 9,110,896 B2 | 8/2015 | Jeong | |
| 9,370,995 B2 | 1/2016 | Jeong | |
| 9,333,850 B2 | 5/2016 | Ruppert | |
| 9,365,106 B2 | 6/2016 | Bruckner | |
| 9,670,824 B2 | 6/2017 | Sowards | |
| 9,676,269 B2 | 6/2017 | Jeong | |
| 9,694,669 B2 | 7/2017 | Ruppert | |
| 9,701,191 B2 | 7/2017 | Yoshioka | |
| 9,758,031 B2 | 9/2017 | Edwards | |
| 9,840,144 B2 | 12/2017 | Aizawa | |
| 9,869,283 B2 | 1/2018 | Boom | |
| 2002/0056540 A1 | 5/2002 | Mizorogi | |
| 2006/0104074 A1 | 5/2006 | Boniface | |
| 2006/0202508 A1 | 9/2006 | Aase | |
| 2008/0092832 A1 | 4/2008 | Rielesch | |
| 2008/0178526 A1 | 7/2008 | Browne | |
| 2010/0062895 A1 | 3/2010 | Brouwer | |
| 2010/0147611 A1* | 6/2010 | Amano | B60K 6/365 180/68.1 |
| 2010/0243351 A1* | 9/2010 | Sakai | B60K 11/085 180/68.1 |
| 2010/0243352 A1* | 9/2010 | Watanabe | B60K 11/085 180/68.1 |
| 2010/0282533 A1* | 11/2010 | Sugiyama | B60K 11/085 180/68.1 |
| 2011/0226541 A1* | 9/2011 | Hori | B60K 11/085 180/68.1 |
| 2011/0246023 A1* | 10/2011 | Lockwood | F01P 7/10 701/36 |
| 2012/0012410 A1 | 1/2012 | Hori | |
| 2012/0132474 A1* | 5/2012 | Charnesky | B60K 11/085 180/68.1 |
| 2013/0092462 A1 | 4/2013 | Chinta | |
| 2013/0255599 A1 | 10/2013 | Jentz | |
| 2013/0255604 A1 | 10/2013 | Rollinger | |

FOREIGN PATENT DOCUMENTS

| | | |
|---|---|---|
| DE | 3522592 | 1/1987 |
| DE | 3701584 | 8/1988 |
| DE | 3731980 C1 | 3/1989 |
| DE | 4020953 | 1/1992 |
| DE | 19719991 | 11/1998 |
| DE | 10119178 A1 | 1/2002 |
| DE | 10047952 | 4/2002 |
| DE | 10218700 | 11/2003 |
| DE | 10002023 B4 | 1/2004 |
| DE | 10307632 | 9/2004 |
| DE | 202005 010683 | 10/2005 |
| DE | 60208158 | 8/2006 |
| DE | 102006042627 | 3/2008 |
| DE | 102007030890 | 1/2009 |
| DE | 102009014003 | 9/2010 |
| DE | 102009035362 | 2/2011 |
| EP | 2 233 341 | 9/2010 |
| EP | 2233343 | 9/2010 |
| EP | 2248693 | 11/2010 |
| EP | 2325035 | 5/2011 |
| EP | 2371602 | 10/2011 |
| FR | 2738779 | 3/1997 |
| IN | 2009/02057 | 6/2010 |
| JP | 1018744 | 1/1989 |
| JP | H05-053367 | 8/1993 |
| JP | 2003-097976 | 4/2003 |
| JP | 2009-261130 A | 11/2009 |
| JP | 2010/223150 | 7/2010 |
| JP | 2010-247819 | 11/2010 |
| KR | 10-2004-0097420 | 11/2004 |
| KR | 10-2007-0085335 | 8/2007 |
| KR | 10-2010-0015510 | 2/2010 |
| WO | WO 2007/108803 | 9/2007 |
| WO | WO 2007/130847 | 11/2007 |
| WO | WO 2009/091246 A | 7/2009 |

OTHER PUBLICATIONS

International Search Report, from PCT/NL2012/050524 (WO 2013/012337), dated Oct. 5, 2012.
International Search Report from PCT/NL2013/050414 (WO 2013/187760), dated Jul. 17, 2013.
Notice of Allowance from U.S. Appl. No. 14/403,859 dated Jun. 23, 2015.
Office Action dated Apr. 24, 2015, from Chinese App No. 2011800558421, with English Translation.
Office Action from U.S. Appl. No. 13/885,424 dated Jun. 18, 2015.
Office Action from U.S. Appl. No. 13/885,424 dated Nov. 12, 2014.
Office Action from U.S. Appl. No. 13/885,424 dated Nov. 6, 2015.
Office Action from U.S. Appl. No. 14/407/139 dated Sep. 28, 2015.
International Search Report dated Oct. 25, 2013 from PCT/NL2013/050482.
Office Action from JP 2013-538679 dated Oct. 26, 2015.
Office Action from Korean App No. 10-2013-7013416 dated Aug. 5, 2016 with English translation.
Merkmalsgliederung des Anspruchs 1.
Notice of Opposition from EP 11782253.6 dated May 7, 2015.
Notice of Opposition from EP 11782253.6 dated Jun. 17, 2015.
Office Action from U.S. Appl. No. 14/772,318 dated Dec. 29, 2017.
Office Action from Chinese Application No. 201380035424.5 dated Oct. 9, 2016 with English translation.
Office Action from Japanese Application No. 2015-520088 dated Jan. 10, 2017 with English translation.
Office Action from Korean Application No. Oct. 2015-7000656 dated Jan. 22, 2018 with English translation.

* cited by examiner

ADJUSTMENT SYSTEM, PRIMARY ADJUSTMENT UNIT AND SECONDARY ADJUSTMENT UNIT, AIR INTAKE, MOTOR VEHICLE

RELATED APPLICATIONS

This application is a 35 U.S.C. § 371 national phase application of PCT/NL2013/050482 (WO 2014/007617), filed on Jul. 2, 2013, entitled "Adjustment System, Primary Adjustment Unit And Secondary Adjustment Unit, Air Intake, Motor Vehicle", which application claims the benefit of Netherlands Application No. 2009105, filed Jul. 2, 2012, which is incorporated herein by reference in its entirety.

The invention relates to a system for adjusting shutoff elements of an air intake of a motor compartment of a motor vehicle.

The motor compartment of a motor vehicle is usually provided with a cooling device for cooling the motor. The motor is usually cooled with the aid of a coolant. To that end, the cooling device usually comprises a heat exchanger for exchanging heat between ambient air and the coolant. The coolant can thus give off the heat to the ambient air to cool the motor.

The ambient air is guided via one or more air intakes to the cooling device of the motor vehicle. The air intakes are usually provided with elements. It is known to make the elements of adjustable design, whereby the elements are adjustable between at least a first position in which the air intake is substantially closed, and a second position in which the air intake is substantially open. Through the adjustable design of the elements, it can be attempted to achieve the motor's optimum operating temperature, at which the fuel consumption and/or the $CO_2$ emission can be minimal.

The motor vehicle can be provided with one or more air intakes and/or an air intake may be provided with one or more sets of shutoff elements. Preferably, each set of shutoff elements is provided with its own adjustment unit for adjusting the set of shutoff elements. Also, a set of shutoff elements may be provided with several adjustment units, so that more power output may be available to adjust the elements. In practice, it has been found that, for one thing, it is difficult to control the adjustment units of several sets in such a way that the adjustment units adjust the elements virtually synchronously. In addition, each adjustment unit is provided with relatively costly electronics for carrying out the control of the adjustment unit. Also, providing an adjustment unit at each set of shutoff elements is relatively complex and expensive.

Publication EP 2 248 693 describes a grille drive unit which is provided with an additional grille controller to bring the adjustment elements to the open position when the battery voltage becomes too high or too low.

Accordingly, there is a need for a system that counteracts at least one of the above-mentioned disadvantages.

To this end, the invention provides a system for adjusting at least two sets of shutoff elements of an air intake of a motor compartment of a motor vehicle, comprising at least two adjustment units, wherein each adjustment unit comprises a drive unit comprising an electric motor and a drive train for adjusting a set of shutoff elements, wherein one adjustment unit is a primary adjustment unit and a further adjustment unit is a secondary adjustment unit, wherein the primary adjustment unit is arranged for primary connection with a central control unit and is arranged for secondary connection with the secondary adjustment unit.

By providing a primary adjustment unit for primary connection with the central control unit and for secondary connection with the secondary adjustment unit, it is sufficient that only a single adjustment unit of the system of adjustment units is connected with the central control unit.

The central control unit may be, for instance, an onboard computer or a motor management system of the motor vehicle, or may be a control unit which in itself in turn is controlled by an onboard computer or a motor management system. Many embodiments are possible.

By just providing a single primary adjustment unit of a set of adjustment units, the other adjustment units can be implemented as secondary adjustment units. The secondary adjustment units can therefore be made of a simpler and cheaper design, which can result in a saving of costs. The secondary adjustment units are arranged only for secondary connection. The secondary adjustment unit is arranged for secondary connection with the primary adjustment unit, and possibly for a further secondary connection with a further secondary adjustment unit. In any case, a secondary adjustment unit has no direct connection with the central control unit.

Through the provision of a primary adjustment unit and secondary adjustment units connected therewith, it is rendered possible to provide, as it were, a tree of adjustment units which are controlled via the primary adjustment unit. Thus, the usually relatively expensive connection with the central control unit can be limited to the primary connection with the primary adjustment unit. The secondary connection can then, if desired, be of a different type than the primary connection, so that it might be made of cheaper and/or simpler design. The secondary adjustment unit and the primary adjustment unit can have a different configuration, whereby the primary adjustment unit is, for instance additionally, arranged for the primary connection. Alternatively, the primary adjustment unit and the secondary adjustment unit can have a same configuration, whereby in that case in the secondary adjustment unit the arrangement for the primary connection remains unused.

Preferably, the primary connection comprises at least a power supply connection and a data connection for control of the primary adjustment unit and/or of one or more secondary adjustment units. The secondary connection preferably comprises a power supply connection and/or a data connection for control of the secondary adjustment unit.

The primary connection with the central control unit can be, for instance, a LIN bus connection, or another connection conventional in the automotive industry, with, for instance, the onboard computer or the motor management system. Such a connection is relatively expensive, which is why it is desirable to limit the use of such connections. By equipping further adjustment units as secondary adjustment units, the further adjustment units need not themselves be connected directly with the central control unit, so that costs can be saved, for instance because the connection between the primary adjustment unit and the secondary adjustment unit can be of simpler design than a LIN bus connection between a conventional adjustment unit and a central control unit. So, only one primary connection needs to be arranged, which is also simpler in installation and maintenance. Moreover, as the central control unit does not communicate directly with the secondary adjustment unit, data traffic over an onboard network of a vehicle can be relatively limited.

The secondary connection with a secondary adjustment unit can for instance be solely a power supply connection, whereby the electric motor of the secondary adjustment unit is provided with power directly via the power supply connection. The secondary adjustment unit can hence be of relatively simple design. As a result, for instance, not only can the connection itself be cheaper, but, what is more, a system with a primary and a secondary adjustment unit can be cheaper than a system with two conventional adjustment units connected in parallel to a central control unit. The secondary adjustment unit may, for instance, be substantially provided only with an electric motor and a drive train. This is to say that the secondary adjustment unit may therefore be implemented without control unit. Obviously, in that case, the secondary adjustment unit may of course further comprise connection elements and/or a housing and/or other additional parts.

The secondary connection with a secondary adjustment unit can comprise, for instance, a power supply connection and a data connection. Possibly, in that case the secondary adjustment unit can, for instance, send a simple pulse over the data connection to the primary adjustment unit, for instance a pulse of the electric motor. Additionally or alternatively, the secondary adjustment unit may be provided with an additional functionality, such as, for instance, a fail-safe mechanism and/or a position determining unit which need additional information and/or send back such information over the data connection. Also conceivable is an embodiment in which the secondary adjustment unit is implemented with a relatively simple processor for receiving and/or passing on control and/or data signals.

The primary adjustment unit may be provided with a primary connection element, for instance, a connector. The primary connection element can be connected with a primary connecting element for the primary connection with the central control unit. Practically speaking, it will be so that a primary connection between the primary adjustment unit and the central control unit can be implemented as a primary cable or primary connecting wire provided with a plug or connecting element which can be received in a connector or a connection element of the primary adjustment unit. Obviously, the primary connecting element can also be implemented as a connector, and the primary connection element can also be implemented as a plug. The primary connection element may at least be arranged for effecting a power supply connection and a data connection with a central control unit, which is to say that the primary connection element preferably has at least three terminals, two for the reception of power and one for the reception of data.

The primary adjustment unit and the secondary adjustment unit may both be provided with a secondary connection element for receiving, or for being received by, a secondary connecting element for the secondary connection between the primary adjustment unit and the secondary adjustment unit. Practically speaking, the secondary connection can be implemented as a secondary cable or a secondary connecting wire provided with a plug or a secondary connecting element which is receivable in a connector or secondary connection element of the secondary adjustment unit. Obviously, the secondary connecting element may also be implemented as a connector, and the secondary connection element may also be implemented as a plug. The secondary connection element is preferably arranged for receiving a power supply connection and/or a data connection. The secondary connection element may therefore be provided with, for instance, two terminals for effecting a power supply connection, or with three terminals for effecting a power supply connection and a data connection. In embodiments in which solely a power supply connection or a data connection is provided, and in implementations whereby supply and data connections are combined or integrated, the number of terminals may be different accordingly.

The primary adjustment unit is therefore distinguished from the secondary adjustment unit in that the primary adjustment unit is arranged for the primary connection and for the secondary connection, whereas the secondary adjustment unit is arranged for only at least a secondary connection. This is to say that the secondary adjustment unit hence is not arranged for a primary connection. In an embodiment it may be that the primary and the secondary adjustment units have the same configuration, for instance, a same number of terminals. In the case of a secondary adjustment unit, however, a number of terminals will then remain unused, or have a different use than in the primary adjustment unit. In any case, the secondary adjustment unit is not arranged for direct connection and/or direct communication with the central control unit.

On the primary adjustment unit, the primary connection element and the secondary connection element may possibly be integrated to form a connection element which is provided with, for instance, at least five terminals, for instance, two terminals for the power supply connection from the primary connection, one terminal for the data connection from the primary connection, and two terminals for the power supply connection from the secondary connection. The connection element can optionally comprise several more terminals. For instance, the connection element can comprise two or more further terminals, for instance, for one or several additional power supply connections which can form one or several secondary connections with a second or a further secondary adjustment unit. A primary adjustment unit can be coupled with various secondary adjustment units. The various adjustment units may be connected in parallel relative to one another, whereby each secondary adjustment unit is connected with the primary adjustment unit. Alternatively and/or additionally, the various secondary adjustment units may be connected in series with one another, which is to say that a secondary adjustment unit may also be connected with a further secondary adjustment unit.

Further advantageous embodiments are represented in the dependent claims.

The invention further relates to a primary adjustment unit and to a secondary adjustment unit, to the use of an adjustment unit as primary adjustment unit, or as secondary adjustment unit, to an air intake, and to a motor vehicle.

The invention will be elucidated in more detail on the basis of exemplary embodiments which are represented in the drawings. In the drawings.

It is noted that the drawing figures are only shown by way of schematic representations of exemplary embodiments of the invention and should not in any way be regarded as limiting. In the figures, like or corresponding parts are denoted with like or corresponding reference numerals.

Figure 1:
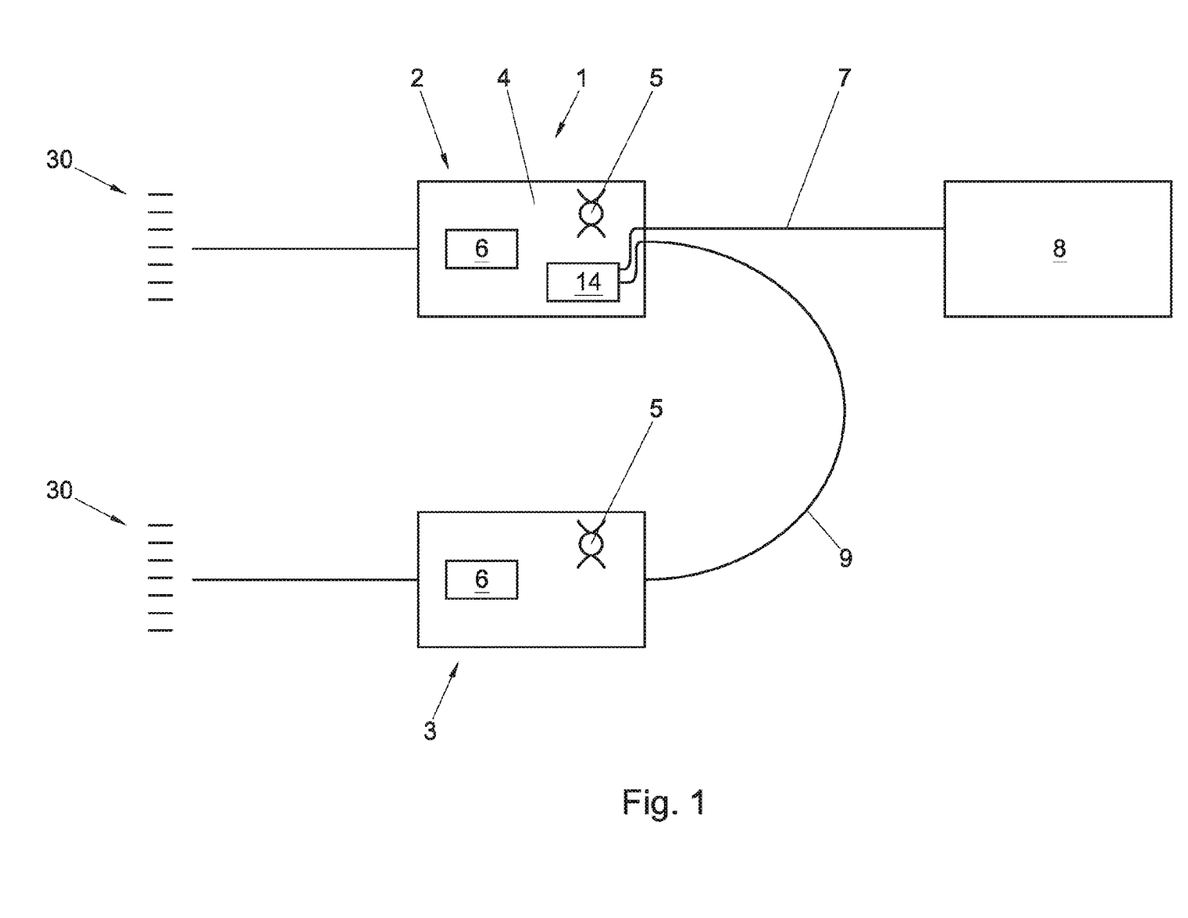
FIG. 1 shows a schematic representation of a system of adjustment units according to the invention.

FIG. 1 shows a schematic representation of a system 1 of adjustment units 2, 3 according to the invention. The system 1 shown in FIG. 1 is suitable for adjusting at least two sets of shutoff elements 30 of an air intake of a motor compartment of a motor vehicle. The sets of shutoff elements 30 are represented schematically here. The shutoff elements 30 can be shutoff strips or louver elements or ring louver elements. Many variants of shutoff elements are possible.

The system 1 comprises at least two adjustment units 2, 3. Each adjustment unit 2, 3 comprises a drive unit 4. The drive unit 4 comprises an electric motor 5. Preferably, the electric motor 5 is a direct-current brush electric motor 5. However, the electric motor 5 can also be a different type of motor, such as a stepping motor. The drive unit 4 comprises furthermore a drive train 6 for adjusting a set of shutoff elements.

One adjustment unit 2 is a primary adjustment unit 2 and another adjustment unit 3 is a secondary adjustment unit 3. The primary adjustment unit 2 is arranged for primary connection 7 with a central control unit 8 and is also arranged for secondary connection 9 with the secondary adjustment unit 3. This means that the secondary adjustment unit 3 does not receive control directly from the central control unit 8, but only via the primary adjustment unit 2. The primary adjustment unit 2 furthermore comprises a control unit 14 which is arranged for both the primary connection 7 and for the secondary connection 9. By providing only the primary adjustment unit 2 for connection with the central control unit 8, the system can be of relatively simple and inexpensive design, since the connection 9 can be simpler than the connection 7. Advantageously, the secondary adjustment unit 3 is only provided with a secondary connection 9.

Figure 2:
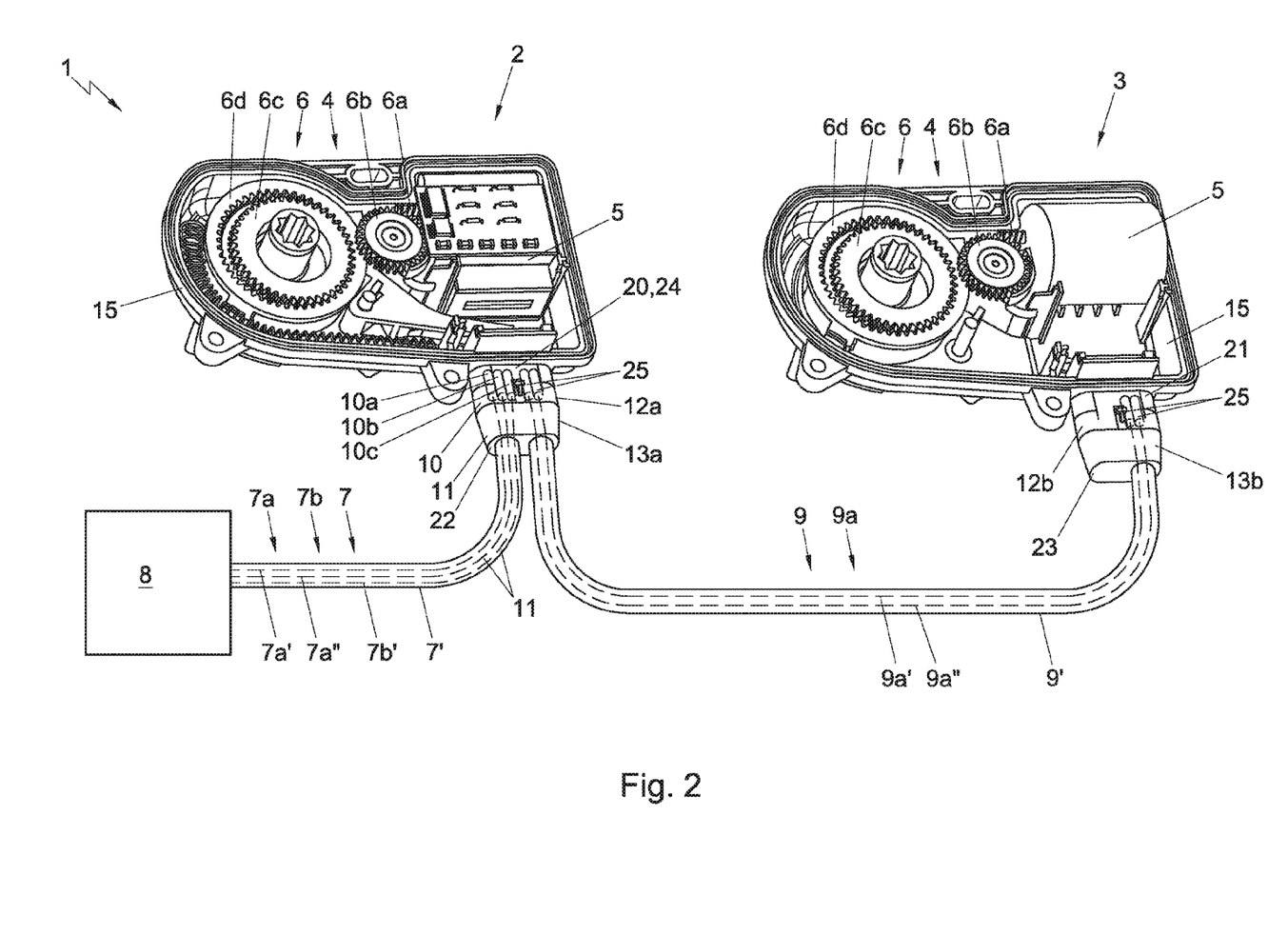
FIG. 2 shows a schematic perspective view of a partly cutaway system according to the invention.

FIG. 2 shows a schematic perspective view of a partly cutaway system 1 of adjustment units 2, 3 according to the invention. The adjustment units 2, 3 are partly cutaway, as a result of leaving out inter alia one non-depicted shell part of each housing 15. For the sake of clarity, further, a number of other parts of the adjustment units 2, 3, such as gears and electric wires, have also been left out of the figures. The system 1 shown in FIG. 2 is suitable for adjusting at least two sets of shutoff elements of an air intake of a motor compartment of a motor vehicle.

The system 1 in this exemplary embodiment comprises two adjustment units 2, 3 with a drive unit 4 comprising an electric motor 5 and a drive train 6 for adjusting a set of shutoff elements. The drive train 6 can comprise, as shown here, a number of reduction elements 6a, 6b, 6c, 6d and can be or comprise, for instance, a compound planetary gear system, a cycloid drive system, or a harmonic-drive drive system.

One adjustment unit 2, in FIG. 2 the left one, is a primary adjustment unit 2 and the other adjustment unit 3, in FIG. 2 the right one, is a secondary adjustment unit 3. The primary adjustment unit 2 is arranged for primary connection 7 with a central control unit 8 and is also arranged for secondary connection 9 with the secondary adjustment unit 3.

In the example shown, the primary connection 7 comprises a power supply connection 7a and a data connection 7b. The power supply connection 7a can comprise, for instance, two cores 7a', 7a", and the data connection 7b can comprise, for instance, a single core 7b'. Other configurations of the primary connection 7 are also possible. Thus, the primary connection 7 can comprise, for instance, several data connections and/or the power supply connection can comprise a different number of cores.

In the preferred embodiment shown, the secondary connection 9 comprises a power supply connection 9a but no data connection. The power supply connection 9a can be used to have the electric motor 5 of the secondary adjustment unit 3 controlled by the primary adjustment unit 2 by providing the electric motor 5 of the secondary adjustment unit 3, if desired, with power. The power supply connection 9a mentioned can comprise, for instance, two cores 9a', 9a".

Alternatively or additionally, the secondary connection 9 may be provided with a data connection, not shown, for controlling the secondary adjustment unit 3. The secondary adjustment unit 3 can then be provided with, for instance, a relatively simple and relatively inexpensive circuit or switch for opening and shutting off the power supply to the electric motor 5 of this secondary adjustment unit 3.

Although the cores 7a', 7a", 7b' of the primary connection 7 are here provided together in a single cable 7' of the primary connection 7, and the cores 9a', 9a" of the secondary connection 9 in turn are here provided together in a single cable 9' of the secondary connection 9, neither the cores 7a', 7a", 7b' of the primary connection 7 nor the cores 9a', 9a" of the secondary connection 9 need to form a single cable 7', 9' together. Thus, the power supply connection 7a and the data connection 7b of the primary connection 7 may, for instance, each be formed by a separate cable. Various options are possible and will be known to those skilled in the art.

The primary adjustment unit 2 is provided with a primary connection element 10 for receiving a primary connecting element 11 for the primary connection 7 with the central control unit 8. Further, the primary adjustment unit 2 is provided with a secondary connection element 12a for receiving a secondary connecting element 13a for the secondary connection 9 with the secondary adjustment unit 3. Although the primary adjustment unit 2 is here provided with a single secondary connection element 12a, in an alternative embodiment the primary adjustment unit 2 can comprise more than one, for instance two or three secondary connection elements 12a. It is noted that the connection elements 10, 12a, 12b in the example shown in FIG. 2 are all formed as (part of) a plug socket 20, 21 which is arranged for receiving a connecting element 11, 13a, 13b formed as (part of) a plug 22, 23. Alternatively, however, one or more, for instance all, connection elements 10, 12a, 12b of the primary and/or secondary adjustment unit can be implemented as a plug, and one or more, for instance all, connecting elements 11, 13a, 13b may be provided as a plug socket for receiving one or more connection elements implemented as plug or part of a plug. It is additionally noted that although the primary connection element 10 and the second connection element 12a of the primary adjustment unit 2 are here integrated in a single connection element 24, the primary connection element 10 and the secondary connection element 12a can also be implemented as separate connection elements.

The primary connection element 10 is here provided with three terminals 10a, 10b, 10c. Two of the terminals 10a, 10b are for the reception of power and one terminal 10c is for the reception of data. The secondary connection elements 12a, 12b are here both provided with two terminals 25 for effecting the power supply connection 9a. Alternatively, the primary and/or secondary connection elements 10, 12a, 12b may also be provided with different numbers of terminals. For instance, the secondary connection elements 12a, 12b can be provided with three terminals, for instance two for effecting a power supply connection and one for a data connection.

In the example shown, the terminals 10a-10c, 25 are designed as plug holes arranged for receiving an end, formed as plug pin, of a respective core 7a', 7a", 7b', 9a', 9a". Alternatively, the terminals 10a-10c, 25, or a number of them, can be implemented differently, for instance, as terminal clamps or as connectors. Also, it is possible, for instance, that one or more terminals 10a-10c, 25 are implemented as plug pin and that one or more connecting elements 11, 13a, 13b are provided with plug holes.

Figure 3:
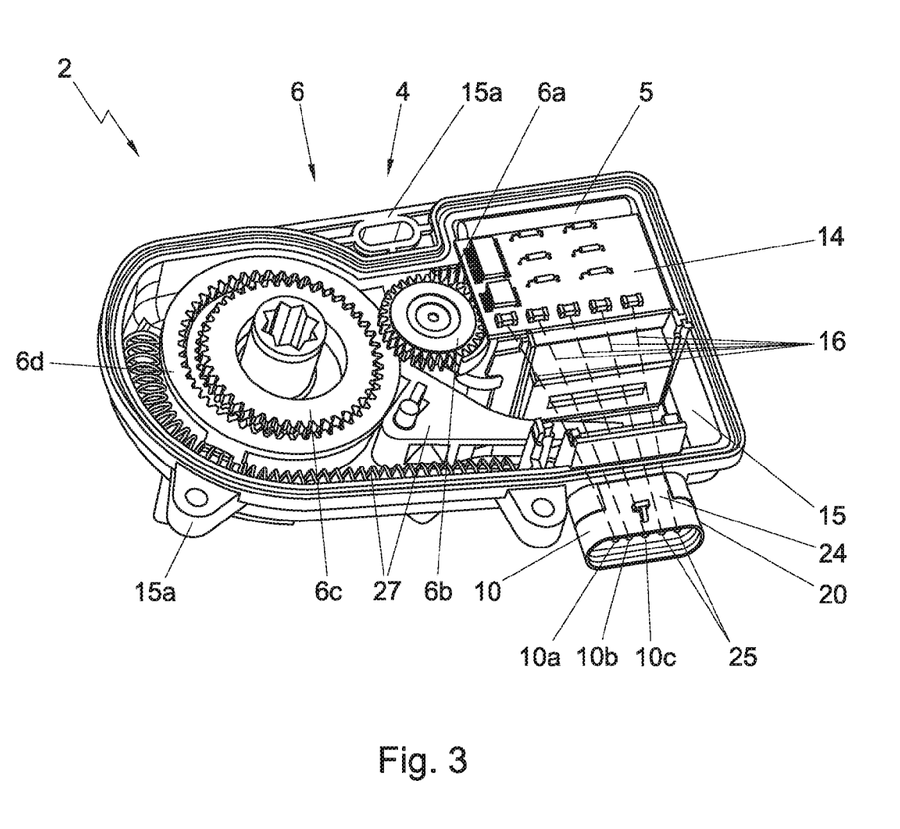
FIG. 3 shows a schematic perspective view of a cutaway primary adjustment unit according to the invention.

FIG. 3 shows a schematic perspective view of a cutaway primary adjustment unit 2 according to the invention. The primary adjustment unit 2 can for instance be included in the system of FIG. 2. The primary adjustment unit 2 of FIG. 3 is suitable for adjusting shutoff elements of an air intake of a motor compartment of a motor vehicle. The primary adjustment unit 2 comprises a drive unit 4 which comprises an electric motor 5 and a drive train 6, 6a, 6b, 6c, 6d driven by the electric motor 5, for adjusting the shutoff elements. The drive unit 4 is here included in a housing 15. In an advantageous embodiment the housing 15 accommodates the other parts of the primary adjustment unit 2. Here, the housing 15 comprises mounting means 15a allowing the housing 15 to be mounted in the motor vehicle.

The primary adjustment unit 2 is arranged for, on the one hand, primary connection with a central control unit and, on the other, secondary connection with a secondary adjustment unit. Preferably, the primary connection is a connection with a central control unit of a motor vehicle, whereby the primary connection most preferably comprises at least a power supply connection and a data connection. The secondary connection 9 preferably comprises a power supply connection and/or a data connection for controlling a secondary adjustment unit.

The primary adjustment unit 2 is here provided with a primary connection element 10 for receiving a primary connecting element for the primary connection with the central control unit. Also, the primary adjustment unit 2 is provided with a secondary connection element 12a for receiving a secondary connecting element for the secondary connection. Although the connection elements 10, 12a are here provided as an integrated connection element 24 in the form of a plug contact 20, various alternatives are possible.

Furthermore, the primary adjustment unit 2 comprises a control unit 14 which is arranged for the primary connection and for the secondary connection. This is to say that the control unit 14 is electrically and/or electronically coupled with terminals 10a, 10b, 10c, 25 of the connection elements 10, 12a, for instance via cores 16 of a multi-core cable, and the control unit 14 is arranged to receive a signal from a central control unit and for instance on the basis of the signal to shut off or open the power supply to its electric motor 5. Also, the control unit 14 may be arranged for, for instance on the basis of a signal from the central control unit, providing power to or withholding it from the terminals 15 of the secondary connection element 12a. In this way, accordingly, the control unit 14 of the primary adjustment unit 2 can control an electric motor of a secondary adjustment unit connected with the primary adjustment unit 2 by temporarily providing it with power.

Figure 4:
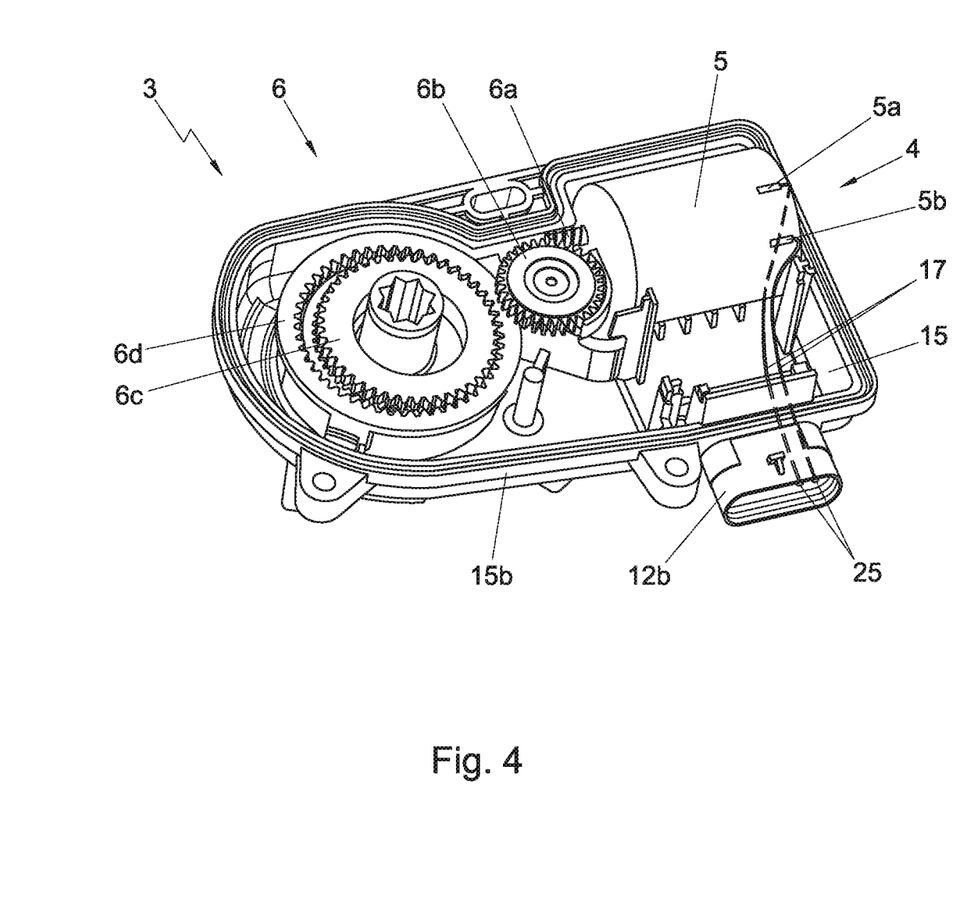
FIG. 4 shows a schematic perspective view of a cutaway secondary adjustment unit according to the invention.

FIG. 4 shows a schematic perspective view of a cutaway secondary adjustment unit 3 according to the invention. The secondary adjustment unit 3 is suitable for adjusting shutoff elements of an air intake of a motor vehicle and is provided with a drive unit 4. The drive unit comprises a drive train 6 with a number of reduction elements 6a, 6b, 6c, 6d and can be, or comprise, for instance, a compound planetary gear system, a cycloid drive system or a harmonic-drive drive system. The drive unit 4 is here included in a housing 15, of which one shell part 15b is shown here. In an advantageous embodiment, the housing 15 accommodates the other parts of the secondary adjustment unit 3.

Also, the drive unit 4 comprises an electric motor 5 for driving the drive train 6 for adjusting the shutoff elements. The secondary adjustment unit 3 is arranged for a secondary connection with a primary adjustment unit for receiving power from the primary adjustment unit. To that end, the secondary adjustment unit 3 comprises a secondary connection element 12b for receiving a secondary connecting element for a secondary connection between the secondary adjustment unit 3 and a primary adjustment unit. Alternatively, the secondary adjustment unit 3 can comprise a different number of secondary connection elements 12b, for instance two or three secondary connection elements 12b. In such a case the secondary adjustment unit 3 may for instance be arranged for transmitting power coming from a primary adjustment unit to a further secondary adjustment unit.

As can be seen in FIG. 4, the secondary connection element 12b comprises two terminals 25 which are connected with motor terminals 5a, 5b of the electric motor 5. This can be done, as shown in FIG. 4, with the aid of two wires 17. Alternatively, the terminals 25 can be connected with the motor terminals 5a, 5b using, for instance, a multi-core cable. Between the terminals 25 and the motor terminals 5a, 5b there is no control unit, in contrast to the primary adjustment unit of FIG. 3 where there is one. In this way, the motor 5 of the secondary adjustment unit 3 can hence be provided with power directly by a primary adjustment unit.

In an embodiment not shown, the secondary connection can furthermore comprise a data connection. Thus, the secondary adjustment unit 3 can comprise, for instance, a position determining unit which via the data connection transmits information, for instance information about a rotational condition of one of the reduction elements 6a, 6b, 6c, 6d, to a control unit of a primary adjustment unit. As already indicated above, the secondary connection can consist of either one or more power supply connections, or one or more data connections, or both. In an embodiment where the secondary connection solely comprises one or more data connections, there is transmitted from the primary adjustment unit at least a switching signal for switching on or off a chive unit in the secondary adjustment unit. In that case the secondary adjustment unit comprises switching means, such as relays or transistors, and its own separate power supply connection.

The invention is not limited to the exemplary embodiments represented above. Many variants are possible and will be clear to those skilled in the art.

Thus, the system, which may or may not comprise more than one secondary adjustment unit, can be provided in a motor vehicle such as a car. Also, a single motor vehicle may be provided with more than one system for adjusting at least two sets of shutoff elements. For instance, a first system may be provided for adjusting elements of a first air intake and a second system for adjusting elements of a second air intake.

In different embodiments which comprise a primary adjustment unit and several secondary adjustment units connected therewith, the secondary connections of the master-slave hierarchy can be implemented in different manners. The primary unit can comprise a single secondary connection in which there are a common data bus and common power supply connection(s). With such a connection, the secondary adjustment units can be connected serially or in parallel to the power supply connections.

To be able in such a system to control the secondary adjustment units separately, there may be provided an addressing of the secondary adjustment units via the data bus, as well as switching means in the secondary adjustment units which switch the power supply on and off depending on received data. When separate control is not necessary, addressing and switching means in the secondary adjustment unit can also be omitted and are at best optional. In that case, the data bus or data connection is also optional.

The system, instead of being designed with a common data bus and common power supply connection(s), may also be designed with individual data connections (and possibly individual or common power supply connections) from the primary adjustment unit to each of the secondary units. The coordination of the synchronous or separate control of the secondary adjustment units is then done from the primary unit.

Furthermore, the system, while suitable for adjustment of at least two sets of shutoff elements, can advantageously be used for adjusting just a single set of shutoff elements. For instance, in that case, the primary and secondary adjustment unit can each on opposite sides of a single set of shutoff elements be coupled with this set. Thus, both adjustment units can then be used for adjusting a single set, for instance to be able to offer more power output.

Also, it is possible to provide one or more adjustment units, the primary adjustment unit and/or the secondary adjustment unit, with a fail-safe mechanism 27, for instance as shown in FIG. 3. The fail-safe mechanism 27 here comprises an arm 28, an elastic element 29 and a magnetizable element 30. In case of a calamity, such as, for instance, a power failure, it may be desirable to adjust the shutoff elements to a predefined position, for instance, the open position or the closed position or an intermediate position. The elastic element 29 is connected on one side with a reduction element of the drive train 6 and is connected on the other side with the arm 28. The arm 28 is pivotable about a pivot 31 between a first position and a second position. In the first position the arm 28 blocks a reduction element of the drive train, usually the outermost ring 6d, and the fail-safe mechanism is not in operation. In the second position the arm 28 has pivoted about the pivot 31 and has released the reduction element. In the second position the fail-safe mechanism has come into operation and the arm 28 has pivoted to the biased second position. The arm 28 is biased to the second position by means of the spring 29.

The arm 28 is held in the first position by the magnetic force of the magnetic element 30. In the first position an end of the arm 28 lies substantially against the magnetic element 30. In the case of a calamity, when loss of power occurs, the magnetic force of the magnetic element 30 falls away and the arm 28 is released, thereby pivoting under the influence of the biasing force of the elastic element 29 to the second position, so that the reduction element is unblocked. Under the influence of the biasing force, the reduction element is then carried along so that the shutoff elements adjust to the predefined position.

Many variants will be clear to those skilled in the art and are understood to fall within the scope of the following claims.

The invention claimed is:

1. A system for adjusting at least two sets of shutoff elements of an air intake of a motor compartment of a motor vehicle, comprising at least two adjustment units, wherein each adjustment unit comprises a drive unit comprising an electric motor and a drive train for adjusting a set of shutoff elements, wherein one adjustment unit is a primary adjustment unit and a further adjustment unit is at least one secondary adjustment unit, wherein the primary adjustment unit is arranged for primary connection with a central control unit and is arranged for secondary connection with the at least one secondary adjustment unit, and wherein the primary adjustment unit further comprises a second control unit which is arranged for the secondary connection with the at least one secondary adjustment unit.

2. The system according to claim 1, wherein the primary adjustment unit is provided with a primary connection element for receiving, or for being received by, a primary connecting element for the primary connection with the central control unit, and at least one secondary connection element for receiving, or for being received by, a secondary connecting element for the secondary connection with the at least one secondary adjustment unit.

3. The system according to claim 1, wherein the at least one secondary adjustment unit is provided with a secondary connection element for receiving, or for being received by, a secondary connecting element for the secondary connection with the primary adjustment unit.

4. The system according to claim 1, wherein the primary connection comprises at least a power supply connection and a data connection.

5. The system according to claim 1, wherein the secondary connection comprises at least one of a power supply connection or a data connection for controlling the at least one secondary adjustment unit.

6. The system according to claim 1, wherein the primary adjustment unit is arranged for adjusting a first set of shutoff elements, and wherein the at least one secondary adjustment unit is arranged for adjusting a second set of shutoff elements.

7. The system according to claim 1, comprising a plurality of secondary adjustment units.

8. The system according to claim 7, furthermore comprising at least two sets of shutoff elements, wherein a set of shutoff elements is connected with the primary adjustment unit and further sets of shutoff elements are each connected with each secondary adjustment unit.

9. An air intake provided with at least two sets of shutoff elements comprising a system according to claim 1 for adjusting the sets of shutoff elements.

10. A motor vehicle provided with a motor compartment with an air intake according to claim 9.

11. The system according to claim 1 wherein the plurality of secondary adjustment units are connected in at least one of parallel or series with each other.

* * * * *